United States Patent
Sunegård

(10) Patent No.: US 12,436,281 B2
(45) Date of Patent: Oct. 7, 2025

(54) LIDAR LOCALIZATION USING OPTICAL FLOW

(71) Applicant: Volvo Truck Corporation, Gothenburg (SE)

(72) Inventor: Anders Sunegård, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 1015 days.

(21) Appl. No.: 17/513,433

(22) Filed: Oct. 28, 2021

(65) Prior Publication Data

US 2022/0155441 A1     May 19, 2022

(30) Foreign Application Priority Data

Nov. 17, 2020   (EP) .................................... 20208113

(51) Int. Cl.
  *G01S 17/06* (2006.01)
  *G01S 7/48* (2006.01)
  *G01S 17/89* (2020.01)

(52) U.S. Cl.
  CPC ............ *G01S 17/06* (2013.01); *G01S 7/4808* (2013.01); *G01S 17/89* (2013.01)

(58) Field of Classification Search
  CPC ........ G01S 17/06; G01S 7/4808; G01S 17/89; G01S 17/46; G01S 17/931; G06T 2207/10016; G06T 2207/10028; G06T 2207/30244; G06T 7/73; G06T 7/30; G06V 20/54; G01C 21/3848
  See application file for complete search history.

(56) References Cited

U.S. PATENT DOCUMENTS

| | | | |
|---|---|---|---|
| 10,390,003 B1 * | 8/2019 | Liu | G01C 21/206 |
| 11,210,775 B1 * | 12/2021 | Wu | G06N 3/045 |
| 2018/0357503 A1 | 12/2018 | Wang et al. | |
| 2019/0383945 A1 | 12/2019 | Wang et al. | |

(Continued)

FOREIGN PATENT DOCUMENTS

| | | |
|---|---|---|
| JP | H09326029 A | 12/1997 |
| JP | 2019040445 A | 3/2019 |
| JP | 2020166153 A | 10/2020 |

(Continued)

OTHER PUBLICATIONS

First Office Action for Chinese Patent Application No. 202111337351.8, mailed Jan. 21, 2024, 16 pages.

(Continued)

*Primary Examiner* — Jennifer Mehmood
*Assistant Examiner* — Dustin Bilodeau
(74) *Attorney, Agent, or Firm* — Withrow & Terranova, PLLC

(57) ABSTRACT

A method for determining a lidar sensor pose with respect to a predefined map image, comprising acquiring a lidar height map; determining an optical flow field, which relates the lidar height map and the map image; and computing a maximum-likelihood/ML estimate of the lidar sensor pose on the basis of the determined optical flow field. The optical flow field may optionally be determined by a regression model, which additionally produces an associated variability tensor to be used in the ML estimation. In particular, the optical flow field may be determined by a trained neural network.

13 Claims, 5 Drawing Sheets

(56) References Cited

U.S. PATENT DOCUMENTS

2020/0167954 A1     5/2020   Wallin et al.
2020/0333466 A1*   10/2020   Hansen .................. G01S 17/08

FOREIGN PATENT DOCUMENTS

KR            101921071 B1    11/2018
WO          2020104423 A1     5/2020

OTHER PUBLICATIONS

Dosovitskiy, A. et al., "CARLA: An Open Urban Driving Simulator," 1st Conference on Robot Learning (CoRL 2017), Nov. 13-15, 2017, Mountain View, CA, United States, 16 pages.

Kingma, D.P. et al., "ADAM: A Method for Stochastic Optimization," arXiv:1412.6980v9 [cs.LG], Jan. 30, 2017, 15 pages.

Linderoth, S. et al., "Map-based Localization Using LiDAR and Deep Neural Networks: Using regression to find rigid transformations between LiDAR scans and an a priori known map," Master's Thesis in Systems, Control and Mechatronics, 2019, Department of Electrical Engineering, Chalmers University of Technology,Gothenburg, Sweden, 89 pages.

Ronneberger, O. et al., "U-Net: Convolutional Networks for Biomedical Image Segmentation," arXiv:1505.04597v1 [cs.CV], May 18, 2015, 8 pages.

Extended European Search Report for European Patent Application No. 20208113.9, mailed Apr. 30, 2021, 9 pages.

* cited by examiner sweep map cut-out

LIDAR LOCALIZATION USING OPTICAL FLOW

RELATED APPLICATIONS

The present application claims priority to European Patent Application No. 20208113.9, filed on Nov. 17, 2020, and entitled "LIDAR LOCALIZATION USING OPTICAL FLOW," which is incorporated herein by reference in its entirety.

TECHNICAL FIELD

The present disclosure relates to the field of navigation technology and in particular to a method and system for accurate localization of a light detection and ranging (lidar) sensor with respect to a predefined map. Localization according to this disclosure is potentially useful in driver assistance and automated driving.

BACKGROUND

With the introduction of high-performance driver assistance systems and automated driving functionality, the requirement for precise position knowledge has increased to the point where satellite-based localization must be coupled with costly correction services to provide adequate accuracy. Even then, such solutions are subject to severe availability and reliability issues, due to various problems including multi-path signals and signal outages in challenging conditions.

A common alternative for high precision localization is to map areas of interest, and then localize relative the pre-recorded map. The lidar sensor is robust to illumination and texture variability, which is an important advantage compared to camera sensors for the localization task. Furthermore, the lidar sensor is useful in other tasks, such as object detection and tracking, which makes it a practical choice for autonomous vehicles.

Most localization methods see the problem divided into a position retrieval stage, commonly referred to as global localization, and a local refinement stage. The coarser global localization is often left to external sensors, such as satellite-based positioning or inertial techniques, though lidar-based position retrieval methods do exist. The present disclosure addresses the local refinement problem.

Early lidar localization methods used template matching to find the rigid transformation that maximizes correlation between the sensor data and the map. To achieve this, both sensor and map points are projected into two-dimensional (2D) images from a top-view perspective, and templates resulting from all transforms in a discrete search space are correlated with the map. Localization accuracy is generally sub-decimeter, but the search space must be constrained to limit the computational complexity, meaning that an accurate sensor pose prior is required.

Another option for lidar localization is to apply a point cloud registration method. The approach of a large body of registration methods is to find a set of correspondences, i.e., pairs of matching features in sensor data and map, and to compute the rigid body transformation that best aligns sensor data with the map. Iterative closest point (ICP) methods run repeated closest-distance searches to determine correspondences, gradually to approach an alignment. ICP and related methods suffer from a tendency to converge to a local minimum when initialization is inaccurate, and are burdened by the computational cost of their repeated correspondence searches. Fast global registration (FGR), for its part, addresses such shortcomings by computing correspondences once, using local feature descriptors, and directly solves for the pose by minimizing a global objective function. FGR is speedy and less affected by the problem with local minima but may be vulnerable to incorrect or ambiguous correspondence matches.

Recent registration literature has applied deep learning to encode better performing descriptors and to detect key points whose descriptors are likely to form accurate matches. This has led to significant improvements in descriptor performance for registration. Yet the problem of encoding point descriptors that capture both the large structure shape required for global matching and the fine detail necessary for precision localization largely remains unsolved.

SUMMARY

One objective is to propose a method for determining a lidar sensor pose with a linear and angular localization accuracy that is comparable to ICP and other high-performing methods, typically <0.04 m position and <0.1° heading angle. Another objective is to propose a lidar pose determination method that typically manages to recover position with a prior error of 20 m or more. Another objective is to propose a lidar pose determination method that is robust to 'difficult' scenes, with non-salient or repetitive structure. It is a particular objective to propose such a method which lends itself to implementation, in part, by a regression model. Ease of training is a desirable property of such a network. It is furthermore desirable that the network is capable of regression at different spatial scales, to enable it to handle both position recovery and high-accuracy localization. It is finally an objective to propose hardware implementing a method with the above characteristics.

At least some of these objectives are achieved by the invention as defined by the independent claims. The dependent claims are directed to advantageous embodiments of the invention.

According to a first aspect of the invention, there is provided a method for determining a lidar sensor pose with respect to a predefined map image. The method comprises the steps of acquiring a lidar height map; determining an optical flow field, which relates the lidar height map and the map image; and computing a maximum-likelihood (ML) estimate of the lidar sensor pose on the basis of the determined optical flow field.

The use of an optical flow field to find the relation between lidar height map and the map image contributes to the performance of the method. For example, several efficient conventional algorithms exist for computing an optical flow field, and machine-learning implementations constitute another attractive option. The inventor has realized, furthermore, that the optical-flow-based approach enhances the robustness and accuracy as well.

As used herein, "optical flow field"—or "flow field" for short—may be understood as the apparent motion of visual features in a sequence of two or more images. Optical flows for example cases are illustrated in FIG. 7. The motion at a point of the optical flow field may be determined as to its direction and magnitude (speed); as such, the optical flow field of a sequence of images of size W×H can be expressed as a 2×W×H tensor. The two components associated with each point may represent x and y components of the movement or may be a polar representation of the movement. The tracking of the visual features may for example be expressed as a brightness constancy constraint. The concept of optical flow may be generalized to three or more spatial dimensions (generalized optical flow field), as described in the literature.

In the present disclosure, furthermore, a "height map" may be understood as a collection of ground (or horizontal) coordinates each associated with a vertical coordinate. For example, the height map may be defined with reference to a discrete horizontal reference frame, where at least some of the horizontal cells or points are associated with a height value. If the lidar sensor does not provide output data in this format, or if several lidar sweeps are combined, the lidar data may need to undergo preliminary processing of the type to be described below. When using a lidar sensor which is operable to output both range information and intensity information, the height map is primarily to be created on the basis of the range information. The height map may be represented as a point cloud.

According to a second aspect of the invention, there is provided a navigation system comprising: a communication interface for acquiring a lidar height map; a memory adapted for storing a predefined map image; first processing circuitry configured to determine an optical flow field, which relates the lidar height map and the map image; and second processing circuitry configured to compute an ML estimate of the lidar sensor pose on the basis of the determined optical flow field.

According to a third aspect, the invention provides a computer program containing instructions for causing a computer, or the navigation system in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storages of magnetic, optical or solid-state type. Still within the scope of "data carrier", such memories may be fixedly mounted or portable.

The first, second and third aspects of the invention generally share the same advantages and can be embodied in analogous ways.

In some embodiments, for example, the optical flow field is determined by a regression model, which additionally produces an associated variability tensor. Then, the ML estimate of the lidar sensor pose is computed further on the basis of the variability tensor. Unlike an a priori computation of the optical flow field, these embodiments may advantageously utilize any visual, topographical etc. similarities between different execution runs, thereby possibly simplifying the computations and rendering them more resilient. In these embodiments, it is furthermore advantageous to implement the regression model as a trained or trainable neural network.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
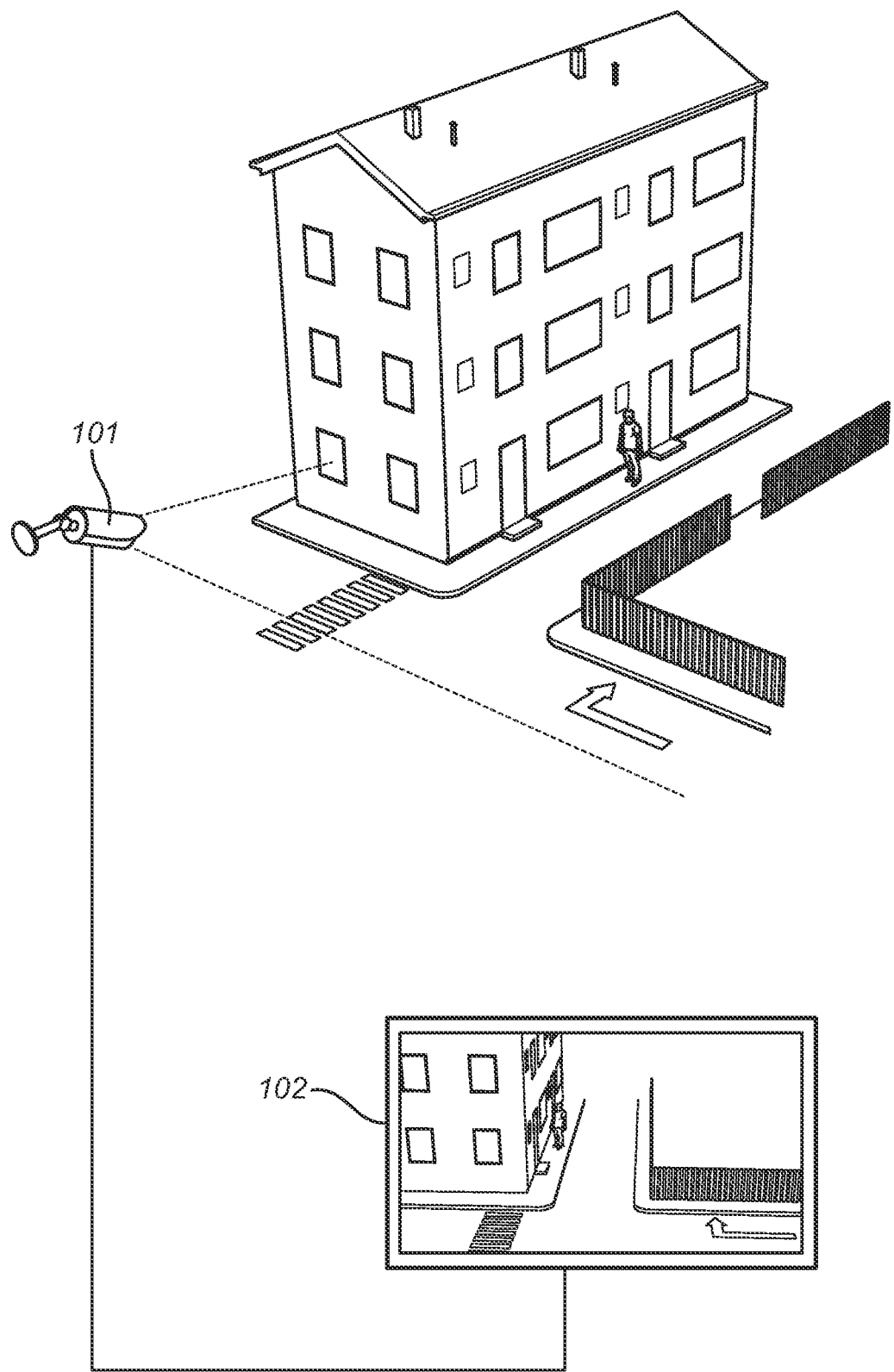
FIG. 1 shows an optical sensor imaging an urban area.

The pose determination problem to be addressed by the present invention is conceptually illustrated in FIG. 1, which shows an optical sensor 101 in the process of imaging an urban area that includes streets, buildings and other structures generally to be found on a public or application-specific map image, as well as additional objects such as pedestrians and vehicles that may be present at the time of imaging. A sensor image corresponding to the view of the urban area seen from the optical sensor 101 (projection of the urban area on an image plane of the optical sensor 101) is visualized on a display 102. The pose determination problem may be formulated as: Given the map image and the sensor image, determine where the optical sensor 101 is located and how it is oriented. The location of the optical sensor 101 is preferably to be expressed with respect to a reference point on the map image, e.g., by finding a so-called pose correction transform (or error correction transform). The reference point may be a coarse position estimate or an arbitrary point.

It is noted that FIG. 1 is included mainly for illustration purposes. When the optical sensor 101 is a lidar sensor, its data may not be amenable into a visual image like the one appearing on the display 102. The field of view (FOV) may be different as well. While some available lidar sensors, have a FOV that is limited horizontally, other sensors, in particular scanning (or rotating) lidar sensors, have a full 360° FOV horizontally and are limited only vertically. Despite the simplifications that FIG. 1 entails, several relevant aspects of the lidar pose determination problem remain similar to the case of visual imaging.

Figure 2:
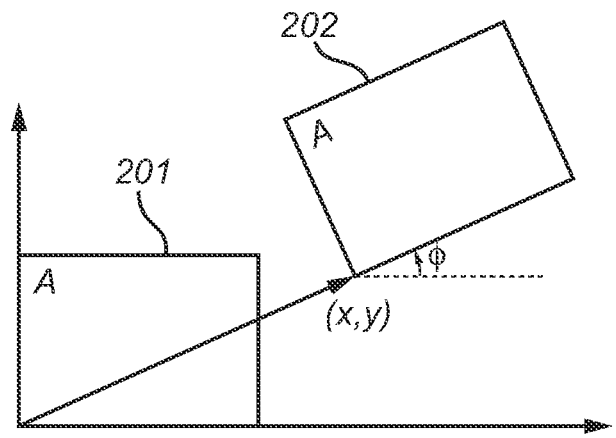
FIG. 2 illustrates registration of two images, wherein a rigid movement (pose/error correction transform) that makes the images coincide is determined.

FIG. 2 illustrates registration of an image 202 in relation to a reference image 201. In the plane coordinate system indicated, the relation is expressed as rigid movement composed of a translation (x,y) and a rotation $\phi$ which would cause the images 201, 202 to coincide. The rotation $\phi$ may be a combination of multiple rotation components, to express a spatial rotation. The movement may be referred to as a pose correction transform or error correction transform.

Figure 7:
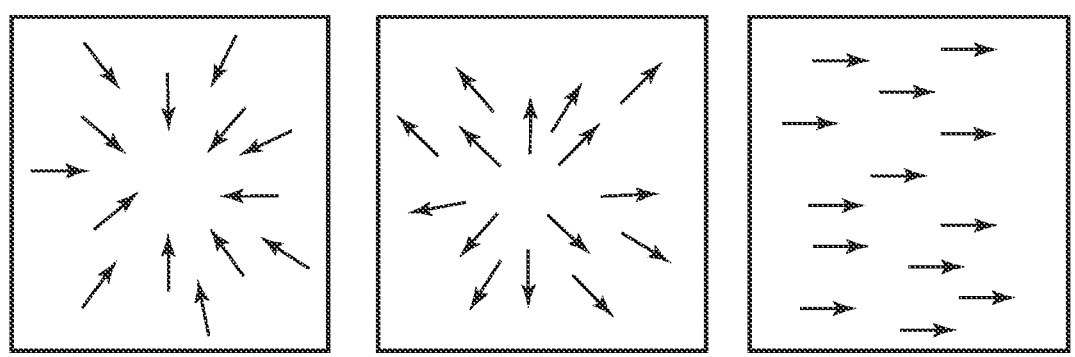
FIG. 7 represents optical flow patterns during a zoom-in, a zoom-out and a right-to-left pan, respectively.

In embodiments of the invention, the images 201, 202 may correspond to the map image and height map. Such embodiments may be restricted to determining the pose correction transform as a rigid movement—rather than a general movement—since it follows from theoretical result that rescaling, shearing and other non-rigid transformations cannot result from a change of pose of a top-view lidar sensor. (Certainly, non-static objects may have entered or left the scene, or moved.) Starting from an optical flow field, which associates image points with local translation vectors, the parameters x, y, $\phi$ of the pose correction transform can therefore be determined from an overdetermined system of equations. In embodiments targeting the three-dimensional case, the pose correction transform may further include corrections of the height z and a pitch or roll angle $\psi$. While this determination will be discussed in detail below, the underlying principle can be realized by comparing the simple examples in FIG. 7, where the sub-figures illustrate the flows to be expected during a zoom-in (non-rigid transformation due to scale change), a zoom-out (non-rigid transformation due to scale change) and a right-to-left pan (rigid transformation).

Figure 4:
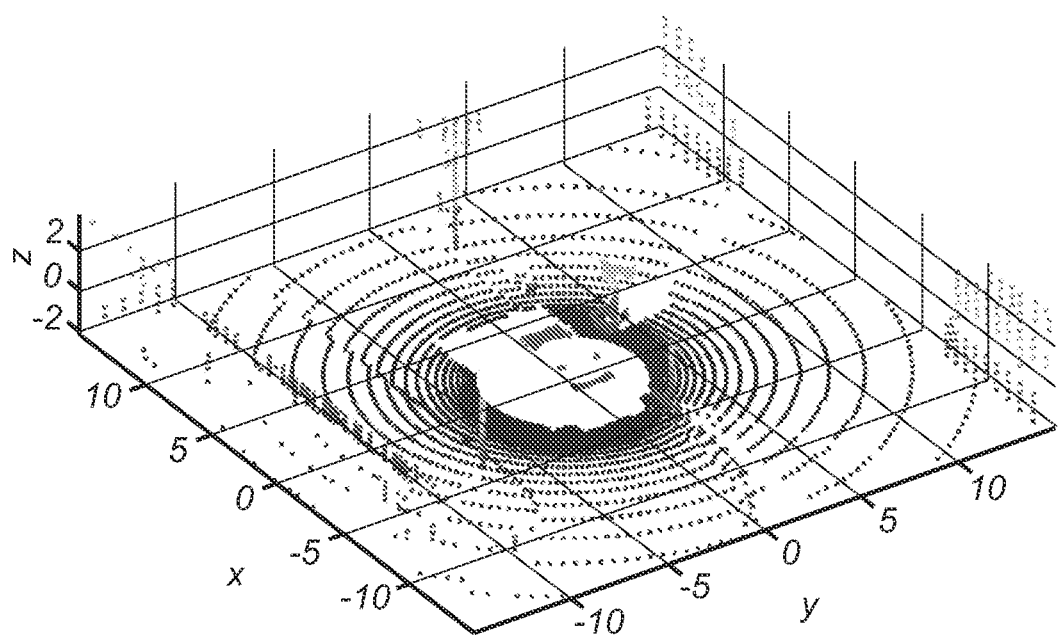
FIG. 4 is a visualization of raw data from a single lidar measurement.
Figure 5:
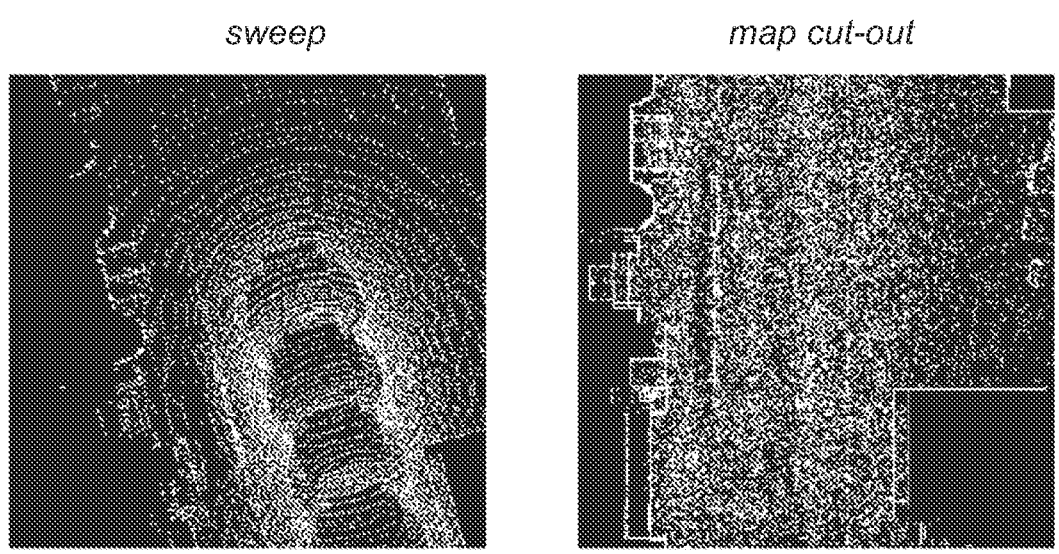
FIG. 5 illustrates multiple rotated and translated lidar sweeps which are processed into a map cut-out represented as a bird's eye view (or top view)
Figure 6:
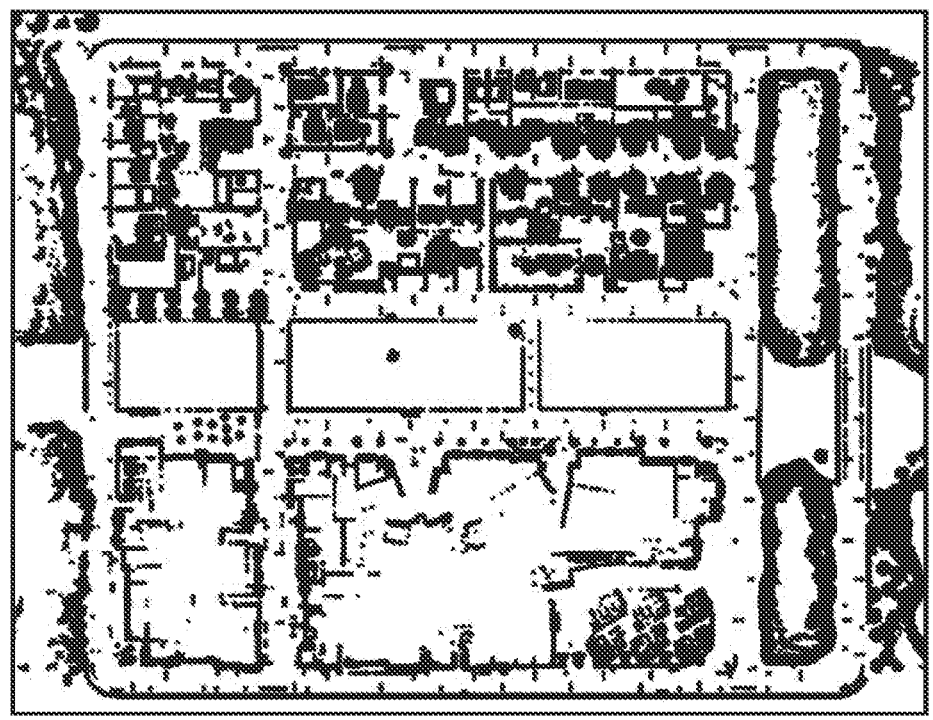
FIG. 6 is a bird's eye representation of an urban environment.

Reference is now made to FIGS. 4, 5 and 6, which illustrate some representative properties of lidar sensor data and lidar range information in particular. FIG. 4 is a visualization of raw data from a single lidar measurement. The lidar sensor is positioned at or near the origin x=y=0. As far as can be deduced from the data, there are major obstacles located in the vicinity of the corners (x,y)=(−15,15), (x,y)=(15,−15) and (x,y)=(15,15), and another obstacle at (x,y)=(15,5). Three lower and thinner obstacles appear to be located at a radius of about 5 units from the origin. Apart from these obstacles, the lidar sensor is located in free field, as can be deduced from the data points on the concentric circles which are at ground height (e.g., z=0). The radius of each circle is related to the lidar sensor's depression angle during the recording of the data points.

As FIG. 4 shows, radial coordinates may be the native format of lidar sensor data. A representation in cartesian coordinates (e.g., north-east-up) may be preferable in a navigation system. Such representation may also facilitate the combining or merging of lidar sensor data set that are recorded during sweeps at different sensor locations, as is generally the case with a vehicle-carried sensor. This will be described with reference to FIG. 5.

The left part of FIG. 5 is a top view of multiple data points, which may be located at different heights but are here plotted using a uniform color. The data points were recorded during four lidar sweeps separated by horizontal translations of the sensor in an approximate north-northwest direction. The data point density is at the highest in areas close to the recording positions where the sensor sweeps have overlapped to a great extent. The right part of FIG. 5 (map cut-out) has been obtained from the left part (sweeps) by a transformation which concatenates the data from the four sweeps. The transformation may furthermore even out the data point density, so as to neutralize or moderate the radial nature of the sensor data. The transformation may further include a contour-finding component, e.g., an algorithm looking for data point patters suggesting the presence of vertical surfaces of different heights, such as curbs, fences and building facades. Lidar data processed by one or more of such transformation steps may be used as a height map in the sense of the claims, as an alternative to using raw lidar data.

The transformation illustrated in FIG. 5 may render the lidar sensor data easier to compare with—and easier to situate in—a map image like the one shown in FIG. 6. This figure is a bird's eye representation (top view) of an urban environment. Generally speaking, FIG. 6 is a concatenation of all objects in the environment that are discoverable by a substantially lateral laser reflection.

Figure 3:
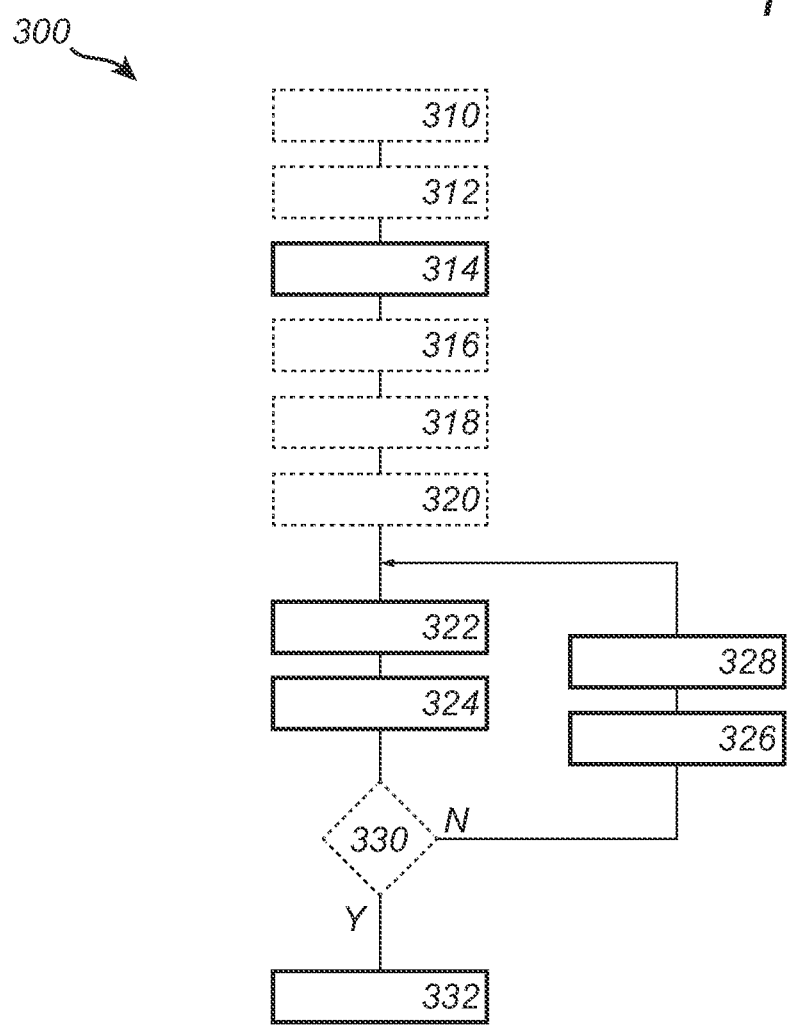
FIG. 3 is a flowchart of a method according to embodiments of the invention.

FIG. 3 is a flowchart capturing pose determination methods 300 according to different embodiments of the invention. The embodiments differ, inter alia, by the presence or absence of the optional elements that have been drawn by dashed line. A basic embodiment of this method 300 may comprise:

an acquisition 314 of a lidar height map;
a determination 322 of an optical flow field, which relates the lidar height map and the map image; and
a computation 324 of an ML estimate of the lidar sensor pose on the basis of the determined optical flow field.

The method 300 solves the localization problem by first estimating an optical flow field between the sensor and map coordinate frames, and by then using the flow field to compute the sensor location, i.e., to estimate the relation to the prior location (see below) in terms of translation and angle(s). Specifically, the sensor and map cloud data may be discretized into 2D grids in top-view perspective with a features vector for each grid cell. In one embodiment, a neural network is used to regress the optical flow field, i.e., a set of 2D vectors that estimate the translation of the center of each grid cell in the sensor image into the map coordinate frame.

It is assumed that the height map is available as a point cloud. If a 2D optical flow field is to be used, it is moreover assumed that the vertical direction of the sensor is known, so that its data can be transformed into a coordinate system whose vertical axis is aligned with the gravitational axis. Furthermore, a prior on the sensor pose, which is accurate to approximately 20 m and 20° heading angle, is obtained. Normally, such a prior is available from satellite-based localization, or from inertial odometry based on a previous localization. This corresponds to a step 310 of the method 300. The prior position defines the center point of the area of the map which is to be extracted, in step 312, for feature image construction.

Aspects of the height map acquisition 314, including suitable processing of the raw sensor data, have been described with reference to FIGS. 4 and 5.

To cast the problem into an optical flow formulation, the input points from sensor and map are transformed into suitable coordinate systems, such as cartesian systems. Using the prior information of the sensor's vertical axis and its heading, a transform operator $T_{ES}$ is defined which rotates points expressed in the sensor coordinate frame S to the error frame E, which is aligned with the map axes, but with a remaining error in heading due to the prior error. The map points are extracted from an area of the map centered at the prior position, and then translated from the map coordinate frame M to the crop frame C with its origin at the prior position, by defining an operator $T_{MC}$ and applying its inverse on the extracted points. The sought sensor pose transform $T_{MS}$, relative to the map coordinate frame M, can be computed as the composition $$T_{MS}=T_{MC}T_{CE}T_{ES},$$

where $T_{CE}$ is the to-be-computed pose correction transform that aligns the rotated sensor points with the translated map crop points.

The transformed point sets are partitioned into 2D grids in the horizontal plane, where the sensor grid contains $W_s \times H_s$ cells. The map grid is of a larger $W_m \times H_m$ size, so as to support flow vector end points outside the sensor grid borders. For each grid cell, a feature vector is computed. As an example, the feature vector may be defined as $x=[n,\tilde{z},\sigma]^T$, in which n is the number of points contained in the cell, $\tilde{z}$ represents the mean height of the points, and $\sigma$ is the standard deviation the points' vertical coordinates. This information is collected in a sensor input tensor $_EX_s$ and a map input tensor $_CX_m$.

An example of the determination 322 of the optical flow field in the 2D case will be discussed next.

For a given resolution level 1, the corresponding flow field regressor function $f^{(l)}$, defined as $(F_{CE}, \theta_\Sigma) = f^{(l)}(_EX_s, _CX_m)$, is a neural network that outputs a $2 \times W^{(l)} \times H^{(l)}$ flow field tensor $F_{CE}$ and a $3 \times W^{(l)} \times H^{(l)}$ flow covariance parameter tensor $\theta_\Sigma$ (variability tensor). Each spatial grid cell in the output tensors is enumera-ted with the index $i \in [1, N^{(l)}]$, where $N^{(l)} = W^{(l)} H^{(l)}$. This index is used to denote $f_i$, the flow vectors from each grid cell of $F_{CE}$, $\theta_i$, the parameters of the covariance matrix for each flow vector, and $p_i$, the grid cell center point. The neural network is trained with ground truth flow fields $F_{gt}$ using a log-likelihood loss given by $$\mathcal{L}(\theta_\Sigma, F_{CE}, F_{gt}) = \sum_{i=1}^{N} \log \det \Sigma(\theta_i) + (f_i - f_{i,gt})^T \Sigma(\theta_i)^{-1} (f_i - f_{i,gt}),$$

where parameters $\theta_i$ of covariance matrices $\Sigma(\theta_i)$ at each grid cell are regression variables, and the dependence on the resolution l is implicit.

Figure 8:
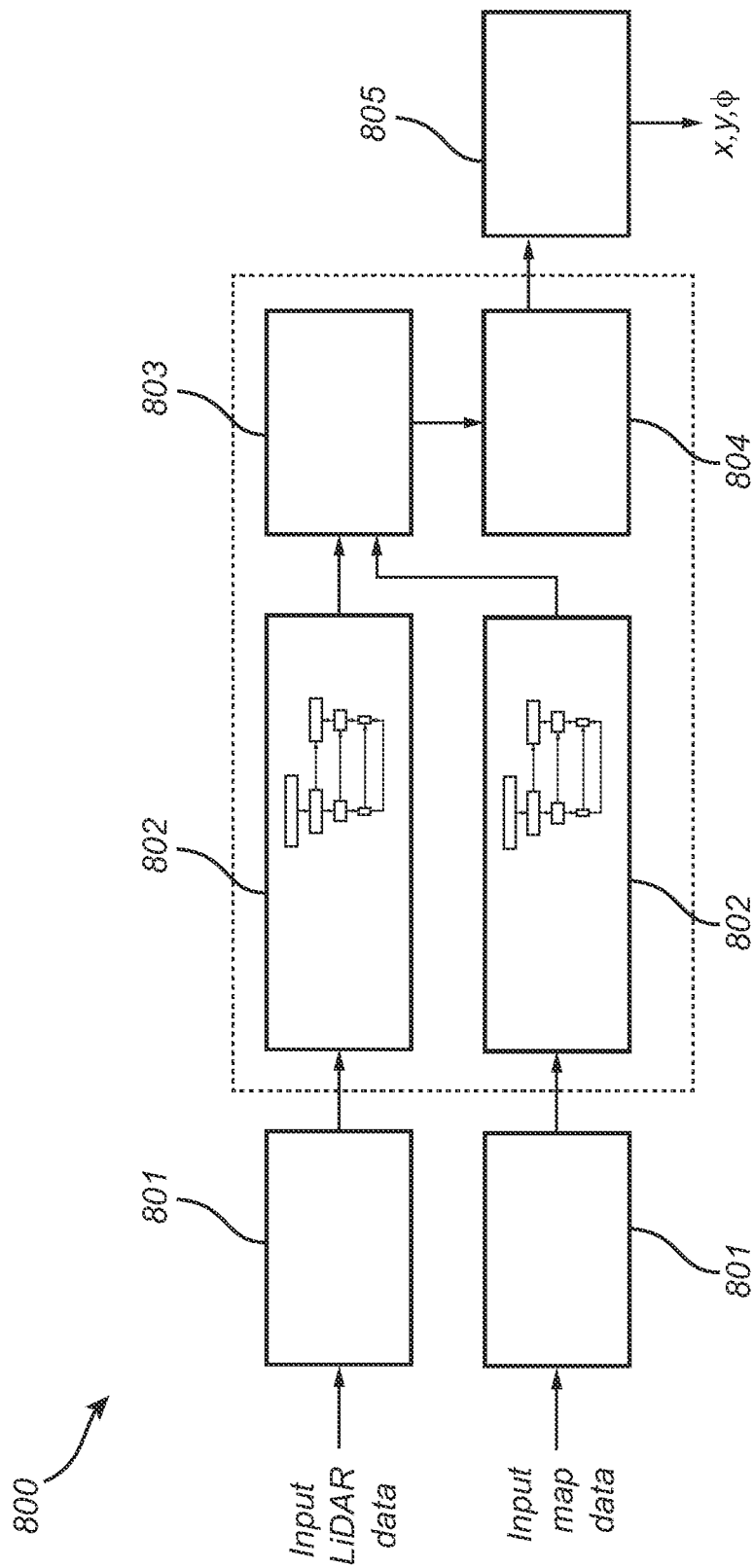
FIG. 8 shows, according to an embodiment of the invention, an architecture of a localization pipeline for one resolution level, which includes trainable and non-trainable logical units.

The neural network that defines the regressor function $f^{(l)}(_EX_s, _CX_m)$ may be structured as illustrated in FIG. 8. According to this example structure 800 (localization pipeline), each lidar data input is associated with a feature encoder 802 followed by a feature correlation module 803, which receives data from each branch, and the probabilistic flow regression module 804. Elements 801 perform an optional partition of the lidar data (point cloud) into cells of a discrete 2D horizontal grid and optional further preprocessing of the data in each grid cell.

The encoders 802 may use a U-Net-like structure (see O. Ronneberger et al., "U-Net: Convolutional networks for biomedical image segmentation", in: *International Conference on Medical image computing and computer-assisted intervention*, Lecture Notes in Computer Science, Springer, vol. 9351 (2015), pp. 234-241). The U-Net structure may include skip connections to encode the sparse inputs into feature maps with large receptive fields, as will be further discussed with reference to step 320. The network has one down-sampling chain that applies $3 \times 3$ two-dimensional convolutions in six groups of three convolutional layers each. Each group halves the spatial dimensions of the tensor. The chain is followed by an up-sampling chain with the same structure as the down-sampling chain, but each group has a skip connection input from the down-sampling chain. The up-sampling chain contains groups up to the spatial dimension determined by the multi-level localization procedure.

The correlation module computes 803 the scalar products of the feature vector at each location in the encoded sensor feature tensor and feature vectors from a set of neighboring locations around the same position in the map image. To accommodate neighbor locations outside the sensor image borders, the map data image is extracted from a larger area such that it fits all neighbors. The operation results in a vector of scalar products per location in the sensor feature image, where each component is associated with a neighborhood location.

The correlation volume is input into the flow field regressor network 804, which may have a base of five $3 \times 3$ two-dimensional convolution layers. The base is followed by one branch of three convolution layers for regressing flow field $F_{CE}$, and another branch of four layers for regressing covariance parameters tensor $\theta_\Sigma$.

A pose computation module 805 produces the end result on the basis of the flow field.

As an alternative to this structure 800, the implementation of the regressor function $f^{(l)}(_EX_s, _CX_m)$ may include a deep neural network with a different number of layers than discussed here. It has already been mentioned that the computation of the optical flow field may use a general regression model. It is not necessary for the regression model to be a neural network, or to be machine-learning based at all. The optical flow field may also be computed by a direct method not relying on training or modeling; nor is it necessary for this computation to produce a variability tensor.

Continuing the running 2D example, it will now be described how the computation 324 of the sensor pose from the regressed flow field may be performed as an ML estimation of the pose correction transform $T_{CE}$. A pose correction transform of this type was exemplified in FIG. 2. To express the likelihood, the flow field vectors are modeled in terms of $T_{CE}$. Given the transform $T_{CE}$ and a start point $p_i$ of a flow vector, the true flow vector can be expressed as $$h_i(T_{CE}) = T_{CE} p_i - p_i,$$

which is used to model the regressed flow filed vector as $$f_i = h_i(T_{CE}) + e_i,$$

where $e_i \sim \mathcal{N}(0, \Sigma_{\theta,i})$ is the flow vector error, modelled with the regressed covariance matrices. Expressed as a probability density, this corresponds to $$p(f_i | T_{CE}) = \mathcal{N}(f_i; h_i(T_{CE}), \Sigma_{\theta,i}).$$

Under the assumption that flow vectors $f_i$ are conditionally independent, the distribution of the whole flow field can be described as $$p(f_1, f_2, \ldots, f_N | T_{CE}) = \prod_{i=1}^{N} p(f_i | T_{CE}).$$

While this assumption may not be accurate in the general case, it is practical for the purpose of weighting flow vectors in preparation of the pose computation.

In the 2D case, the error correction transform $T_{CE}$ is parameterized by translation $[x, y]^T$ and heading angle $\phi$, as indicated in FIG. 2. The log likelihood can then be written as $$\log L(T_{CE} | F_{CE}) \propto -\sum_{i=1}^{N} \left( \begin{bmatrix} x \\ y \end{bmatrix} - \mu_{i,j} \right)^T \Sigma_{\theta,i}^{-1} \left( \begin{bmatrix} x \\ y \end{bmatrix} - \mu_{i,j} \right),$$

where $\mu_i = \mu_i((\phi, p_i, f_i)$ can be evaluated for any given $\phi$. A set of M heading angle hypotheses $\phi_j$, $j \in [1, M]$ is sampled from a suitable search range, and all $\mu_{i,j}$, $i \in [1, N]$, $j \in [1, M]$ are computed. Then $\hat{x}_j$, $\hat{y}_j$ that maximize log L are computed analytically as per $$\begin{pmatrix} \hat{x}_j \\ \hat{y}_j \end{pmatrix} = \sum_{i=1}^{N} \Sigma \Sigma_{\theta,i}^{-1} \mu_{i,j},$$

where $$\Sigma = \left( \sum_{i=1}^{N} \Sigma_{\theta,i}^{-1} \right)^{-1}.$$

The ML estimate $\hat{x}$, $\hat{y}$, $\hat{\phi}$ is found by identifying the heading hypothesis $\phi_j$ and a corresponding pair $\hat{x}_j$, $\hat{y}_j$ that evaluates to the highest likelihood of all j. Finally, $\hat{T}_{CE}$ is constructed from the estimated parameters and the sought sensor pose transform is computed as $$T_{MS} = T_{MC} \hat{T}_{CE} T_{ES}.$$

This value—or a suitably formatted map position derived from the pose transform $T_{MS}$—may then be output 332.

If the optical flow field was computed by an algorithm that does not produce a variability measure, the variability tensor $\Sigma_{\theta,i}$ may be set to unity. Experimental results for a validation set suggest that the improvements obtained by using actual values of the variability are sometimes moderate. In the general case, and particularly if sparsening pre-processing is applied (see step 320 below), the availability of covariance or another variability measure may be of significant value.

The method 300 may be repeated as often as necessary to provide a fresh lidar sensor pose estimate. For instance, the repetition may be initiated after a predetermined delay, when a movement of the lidar sensor has been detected or in response to some other triggering event.

Multi-scale localization is an optional further development of the method 300. Then, to overcome issues with the limited search space connected with the use of a correlation volume—and with only a limited impact on computational performance—a coarse-to-fine approach may be used to successively resolve the flow field in a pyramidal process. Since the flow field is expected to follow a rigid transform, the pose may be estimated in each iteration, and the next iteration's resolution is increased relative to the current iteration. In situations when the prior pose is precise, it may be sufficient to compute only the finest resolution flow. For occasional re-locating, however, the coarser localization levels can be applied initially to bootstrap the error. In practise this means that multiple versions of the localization pipeline in FIG. 8 may be trained.

Returning to FIG. 3, the embodiment with iterative refinement corresponds to the presence of decision point 330, where it is asked whether the desired resolution has been attained. If this is not the case (N branch), the execution of the method 330 proceeds to increasing 326 the resolution and applying 328 the estimated lidar pose as a prior in a subsequent re-determination 322 of the optical flow field and an ML re-estimation 324 of the lidar sensor pose. If instead the evaluation at decision point 330 reveals that the desired resolution has been attained (Y branch), the result is output at step 332.

Alternatively or additionally, the method 300 may include a step 316 of augmenting the lidar height map with lidar intensity information, wherein the augmented (or enriched) height map replaces the height map in the subsequent processing steps. This is to say, the optical flow field is determined on the basis of the augmented height map and the map image. The intensity information may be acquired from the same lidar sensor which produces the range information from which the height map is established. This may allow a more precise feature vector correlation estimate and thus produce more accurate optical flow field computation.

Alternatively or additionally, the method 300 may include a pre-processing step 318, where the lidar height map and the map image are processed into respective feature images (cf. feature vector x introduced above). The pre-processing may be implemented by the feature encoder neural networks 802 in FIG. 8. While the pre-processing of the lidar height map is typically executed at runtime, the pre-processing of the map image may be completed beforehand and the results stored. As a further option, the pre-processing 318 may be followed by a sparsening operation 320 targeting the feature image of the map image is sparsened. The operation may include eliminating all but a sparse subset of the feature vectors x. For example, only every $n_0^{th}$ feature vector in the x and y directions may be kept, where $n_0 = 10$ or another small integer. Alternatively, stochastic sparsening may be applied. Potential beneficial effects of this include a reduction of the necessary map storage space and that the optical flow is computed at fewer positions, which eases the load on the correlation module 803 and/or the regression module 804 downstream. To determine a suitable value of $n_0$ in a concrete use case, this parameter may be increased from a small initial value while the accuracy is monitored. If $n_0$ grows too large, the algorithm may encounter difficulties localizing the lidar height map with respect to the map image, whereby the accuracy and/or robustness of the algorithm will suffer.

Alternatively or additionally, the described method 300 is combined with statistical temporal filtering, such as Kalman filtering or particle filtering. Repeated ML estimates of the lidar sensor pose—or map positions derived from these—may be the sole data source (observation, measurement) provided to the Kalman filter. Alternatively, the lidar sensor pose may be combined with other data sources such as GNSS or dead reckoning. The data sources which can be relied upon as sensor pose priors are generally useful as inputs to the Kalman filtering as well. The combining with a Kalman filter may improve the stability of the estimated position and may lessen the impact of noise.

The neural networks in FIG. 8 can be trained in any way deemed suitable with respect to the use case intended. For example, the training may be carried out on the basis of synthetic data extracted from the CARLA simulator for training and verification; see A. Dosovitskiy et al., "CARLA: An open urban driving simulator", in: *Proceedings of the 1st Annual Conference on Robot Learning*, 2017, pp. 1-16. The used version 9.8 of the CARLA simulation software includes 7 different worlds, covering urban, rural and highway scenarios. The simulation allows constructing a point cloud map that is unaffected by the quality of reference localization, and provides large quantities of annotated measurements. The built-in lidar simulation module was used, configured to capture 56,000 points per second distributed over 32 layers covering pitch angles between −30° and 10° relative the horizontal plane. The sensor range is set to 100 meters and rotation speed to 20 Hz. For each world, a point cloud map is aggregated by traversing the simulated lidar sensor along all road segments, in 1-meter increments, positioned at 2.4 m above ground level. At each position increment, a full revolution scan is collected and added to the map point cloud. The simulated lidar returns an instantaneous snapshot image that is unaffected by the sensor's travelling speed, so that no rectification is needed. In the same way, simulated online measurement data is collected, and each training example is aggregated from ten consecutive lidar scans, equalling half a second of measurement data. All in all, 42,870 unique sensor measurements and map crop samples from the 7 worlds were obtained, of which all 5,772 from world 4 were used for validation and all 2,013 from world 2 were used for purposes of experimental comparisons.

The dataset includes natural occlusions, namely, that the proximal map contains data that is not seen in sensor measurements, due to objects blocking the line of sight. Thus, the algorithm discussed above is implicitly trained to manage such occlusions, and the following evaluations test the algorithm's performance in partially occluded scenes. The opposite scenario, where the measurement scans contain data from objects that are not in the map, is not included in the dataset.

The CARLA-based training data was infinitely augmented by rotation, such that both the map image and sensor points of each sample were rotated randomly in the horizontal plane. This was found to be necessary to avoid overfitting, since the included CARLA worlds have a strong emphasis on straight roads, features or buildings in north-south or east-west orientations. For training optimization, ADAM with its standard parameters was used; see D. P. Kingma et al., "ADAM: A method for stochastic optimization", arXiv:1412.6980. The step size was fixed at 0.0003. At cold start, it turned out necessary to use a regular Li loss function to find a starting point of non-trivial features.

The present invention may further be embodied as a navigation system with an ability (e.g., by comprising corresponding interfaces) to acquire a lidar height map from a lidar sensor, either directly or through some intermediary, and to retrieve the predefined map image from an internal or shared memory. The navigation system may further include first processing circuitry configured to determine an optical flow field, which relates the lidar height map and the map image, and second processing circuitry configured to compute an ML estimate of the lidar sensor pose on the basis of the determined optical flow field. The portion of FIG. 8 which is enclosed by a dashed-line rectangle may correspond to or be part of "first processing circuitry" in this sense. The navigation system may further include an interface for outputting the computed lidar sensor pose or a position derived from the lidar sensor pose.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. For example, the generalization of the present techniques to higher dimensions, wherein three- or higher-dimensional generalized optical flow may be used, remains within the scope of the present invention.

The invention claimed is:

1. A method for determining a lidar sensor pose with respect to a predefined map image, comprising:
acquiring, by a computing device, a lidar height map;
determining, by a regression model implemented by the computing device, an optical flow field, which relates the lidar height map and the map image, wherein the optical flow field associates image points in the map image or points in the lidar height map with local translation vectors;
further determining, by the regression model, a variability tensor associated with the optical flow field; and
computing, by the computing device, a maximum-likelihood (ML) estimate of the lidar sensor pose on the basis of the determined optical flow field and the variability tensor.

2. The method of claim 1, wherein the computing of the ML estimate of the lidar sensor pose includes maximizing a likelihood of a candidate error correction transform given the determined optical flow field.

3. The method of claim 1, further comprising:
augmenting the lidar height map with lidar intensity information,
wherein the optical flow field is determined on the basis of the augmented height map and the map image.

4. The method of claim 1, wherein the optical flow field is a two-dimensional optical flow.

5. The method of claim 1, wherein the optical flow field is a three-dimensional generalized optical flow.

6. The method of claim 1, further comprising:
pre-processing the lidar height map and the map image into respective feature images; and
sparsening the feature image of the map image,
wherein the optical flow field is detected on the basis of the respective features images.

7. The method of claim 1, further comprising:
initially obtaining a coarse global localization; and
extracting the map image as a subarea of a larger predetermined map image.

8. The method of claim 1, wherein the regression model is implemented by a trained neural network.

9. The method of claim 1, further comprising repeating the steps of determining an optical flow field and computing an ML estimate of the lidar sensor pose, together with optional further steps, at an increased spatial resolution and applying the estimated lidar sensor pose as a prior.

10. A navigation system comprising:
a communication interface for acquiring a lidar height map;
a memory adapted for storing a predefined map image;
first processing circuitry, which implements a regression model configured to determine an optical flow field, which relates the lidar height map and the map image, wherein the optical flow field associates image points in the map image or points in the lidar height map with local translation vectors;
wherein the regression model is further configured to determine a variability tensor associated with the optical flow field; and
second processing circuitry configured to compute a maximum-likelihood (ML) estimate of a lidar sensor pose on the basis of the determined optical flow field and the variability tensor.

11. The navigation system of claim 10, wherein the first processing circuitry includes a trainable component.

12. The navigation system of claim 10, further comprising a Kalman filter configured for position tracking at least partly on the basis of the estimated lidar pose.

13. A computer program product stored on a non-transitory computer-readable storage medium and including instructions to cause a processor device to:
acquire a lidar height map;
determine, by a regression model implemented by the processor device, an optical flow field, which relates the lidar height map and a map image, wherein the optical flow field associates image points in the map image or points in the lidar height map with local translation vectors;

determine, by the regression model, a variability tensor associated with the optical flow field; and compute a maximum-likelihood (ML) estimate of a lidar sensor pose on the basis of the determined optical flow field and the variability tensor.

\* \* \* \* \*